(12) United States Patent
Yamaji et al.

(10) Patent No.: US 11,323,577 B2
(45) Date of Patent: May 3, 2022

(54) IMAGE PROCESSING DEVICE FOR CREATING AN ALBUM

(71) Applicant: FUJIFILM Corporation, Tokyo (JP)

(72) Inventors: Kei Yamaji, Tokyo (JP); Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/432,749

(22) Filed: Jun. 5, 2019

(65) Prior Publication Data
US 2019/0379795 A1    Dec. 12, 2019

(30) Foreign Application Priority Data
Jun. 11, 2018    (JP) .............................. JP2018-110799

(51) Int. Cl.
*H04N 1/00*    (2006.01)

(52) U.S. Cl.
CPC ..... *H04N 1/00196* (2013.01); *H04N 1/00143* (2013.01); *H04N 1/00148* (2013.01); *H04N 1/00188* (2013.01); *H04N 1/00456* (2013.01)

(58) Field of Classification Search
CPC ........... H04N 1/00196; H04N 1/00456; H04N 1/00143; H04N 1/00148; H04N 1/00188; G06T 2207/30196
See application file for complete search history.

(56) References Cited

U.S. PATENT DOCUMENTS

| | | | |
|---|---|---|---|
| 9,299,177 B2 | 3/2016 | Sakai et al. | |
| 2003/0189738 A1* | 10/2003 | Kuwata | H04N 21/4223 358/527 |

(Continued)

FOREIGN PATENT DOCUMENTS

| | | |
|---|---|---|
| JP | 2003-288350 A | 10/2003 |
| JP | 2005-065728 A | 3/2005 |

(Continued)

OTHER PUBLICATIONS

Kai-Yin Cheng et al., "Social Album: Linking and Merging Online Albums based on Social Relationship", Signal & Information Processing Association Annual Summit and Conference (APSIPA ASC), 2012 Asia-Pacific, IEEE, Dec. 3, 2012 (Dec. 3, 2012), pp. 1-8.

(Continued)

*Primary Examiner* — Nicholas Pachol
(74) *Attorney, Agent, or Firm* — Studebaker & Brackett PC

(57) ABSTRACT

Provided are an image processing device that determines a relatively appropriate output form in a case where an output form of an image is determined from a plurality of images, an image processing method, an image processing program, and a recording medium storing the program. Information on a plurality of first image groups used for generation of a previously ordered album is stored in an order reception database. A second image group is transmitted from one user to an order reception server, and an image group similar to the second image group is found from among the plurality of first image groups. Images similar to images extracted as images to be used for an album from the found image group are extracted from the second image group. The extracted images are arranged in the album. An album similar to the previously ordered album is generated.

19 Claims, 16 Drawing Sheets

(56) References Cited

U.S. PATENT DOCUMENTS

| | | |
|---|---|---|
| 2006/0204129 A1 | 9/2006 | Sawano |
| 2006/0242238 A1* | 10/2006 | Issa .................... H04N 1/00137 709/204 |
| 2008/0189609 A1* | 8/2008 | Larson .................. G06F 40/103 715/273 |
| 2011/0212717 A1* | 9/2011 | Rhoads ................... G06F 16/58 455/420 |
| 2011/0304779 A1* | 12/2011 | Wada ................ H04N 1/00461 348/739 |
| 2011/0305395 A1* | 12/2011 | Takayama ............ H04N 21/454 382/190 |
| 2011/0305437 A1* | 12/2011 | Sakaguchi ........... H04N 1/2158 386/278 |
| 2012/0179571 A1* | 7/2012 | Grosso, III ........ H04N 1/00196 705/26.5 |
| 2014/0009495 A1* | 1/2014 | Sakai ...................... G06T 11/60 345/634 |
| 2014/0080428 A1* | 3/2014 | Rhoads ................. H04W 4/025 455/88 |
| 2015/0331566 A1* | 11/2015 | Yonaha .................... H04N 1/46 715/776 |
| 2016/0062716 A1* | 3/2016 | Sasaki .................. G06F 3/1204 358/1.15 |
| 2017/0054858 A1* | 2/2017 | Coelho .............. H04N 1/00196 |
| 2018/0084119 A1* | 3/2018 | Yoshida ............... G11B 27/327 |

FOREIGN PATENT DOCUMENTS

| | | |
|---|---|---|
| JP | 2006-178743 A | 7/2006 |
| JP | 2006-253992 A | 9/2006 |
| JP | 2007-310655 A | 11/2007 |
| JP | 2012-221005 A | 11/2012 |

OTHER PUBLICATIONS

Extended European Search Report issued by the European Patent Office dated Oct. 23, 2019, which corresponds to EP19177107.0-1210 and is related to U.S. Appl. No. 16/432,749.

Communication pursuant to Article 94(3) EPC issued by the European Patent Office dated Aug. 10, 2020, which corresponds to European Patent Application No. 19 177 107.0-1210 and is related to U.S. Appl. No. 16/432,749.

An Office Action; "Notice of Reasons for Refusal", mailed by the Japanese Patent Office dated Jul. 6, 2021, which corresponds to Japanese Patent Application No. 2018-110799 and is related to U.S. Appl. No. 16/432,749; with English language translation.

* cited by examiner

IMAGE PROCESSING DEVICE FOR CREATING AN ALBUM

CROSS-REFERENCE TO RELATED APPLICATIONS

The present application claims priority under 35 U.S.C. § 119 to Japanese Patent Application No. 2018-110799, filed Jun. 11, 2018. Each of the above application(s) is hereby expressly incorporated by reference, in its entirety, into the present application.

BACKGROUND OF THE INVENTION

1. Field of the Invention

The present invention relates to an image processing device, an image processing method, an image processing program, and a recording medium storing the program.

2. Description of the Related Art

A desired image is selected from among a large number of captured images and an album is created using the selected images. However, determining an output form of an image so that an image is selected from among a large number of captured images, a layout is determined, and a template is determined is a relatively troublesome task. Searching for data suitable for a reprint when a reprint according to a customer's request is created (JP2003-288350A) and finding an image similar to a diagnosis target for an image that is the diagnosis target (JP2005-065728A) are considered. Further, for example, presenting a recommended image from an order history in a net print system (JP2006-178743A) and highlighting and displaying previously ordered images according to an order history (JP2007-310655A) are considered.

SUMMARY OF THE INVENTION

However, since a technology described in JP2003-288350A is for a case where reprinting is performed, this technology is not suitable for a case where the output form of a desired image is determined from a plurality of new captured images. A technology described in JP2005-065728A relates merely to finding an image similar to the image that is the diagnosis target, a technology described in JP2006-178743A relates to presenting the recommended image from the order history, and a technology described in JP2007-310655A relates to highlighting and displaying the previously ordered image. In any of the cases, determining an output form of a desired image from a plurality of images is not considered at all.

An object of the present invention is to determine a relatively appropriate output form in a case where an output form of an image is determined from a plurality of images.

An image processing device according to the present invention comprises an image group input device (image group input device) for inputting an image group; and an output form determination device (output form determination device) for determining an output form of an image included in a second image group that is an image group that one user has newly input from the image group input device on the basis of information on images selected by at least one of the one user or another user among images included in a first image group that is a previously input image group.

The present invention also provides an image processing method suitable for an image processing device. That is, this method comprises inputting, by an image group input device, an image group; and determining, by an output form determination device, an output form of an image included in a second image group that is an image group that one user has newly input from the image group input device on the basis of information on images selected by at least one of the one user or another user among images included in a first image group that is a previously input image group.

The image processing device may comprise a processor, and the processor may input an image group, and determine an output form of an image included in a second image group that is an image group that one user has newly input from the image group input device on the basis of information on images selected by at least one of the one user or another user among images included in a first image group that is a previously input image group.

The present invention also provides non-transitory recording medium storing a computer-readable program for controlling a computer of an image processing device and may provide the program.

The image processing device according to the present invention may comprise an output device control device (output device control means) for controlling an output device so that output is performed according to the output form determined by the output form determination device.

The previously input first image group is, for example, an image group input by the one user.

Further, the previously input first image group may be an image group input by the other user.

The output form determination device, for example, determines an image to be extracted from among the second image group that the one user has newly input from the image group input device, a layout of the image included in the second image group that the one user has newly input from the image group input device, or a template for affixing the image included in the second image group that the one user has newly input from the image group input device, on the basis of information on the image selected by the one user among the previously input first image group.

The output form determination device may determine an output form of an image included in the image group that the one user has newly input from the image group input device, on the basis of information on an image selected by the one user from among image group input by the one user among the previously input first image group. In this case, it is possible to obtain an output form further reflecting the preference of the one user.

The output form determination device may determine the output form of the image included in the second image group that the one user has newly input from the image group input device, on the basis of information on an image selected by the other user from among image groups input by the other user among the previously input first image group. In this case, it is possible to obtain an output form further reflecting the preference of the other user.

One user may select whether an image selected by one user from among the image group input by the one user (himself or herself) is to be used as basis information or an image selected by the other user from among the image group input by the other user is to be used as the basis information. Further, the selection may be changed at any time.

The image processing device may further comprise a first image group search device (first image group search means) for finding an image group similar to the second image group that the one user has newly input from the image group input device from among the image group input by the one user among the previously input first image group. In this case, the output form determination device, for example, determines the output form of the image included in the second image group that the one user has newly input from the image group input device, on the basis of information on an image selected by the one user from among images included in the image group found by the first image group search device.

The output form determination device may determine an image to be extracted from among the second image group that the one user has newly input from the image group input device at the same ratio as a ratio between a person image and a non-person image that are included in the image group found by the first image group search device.

The image processing device may further include a second image group search device (second image group search means) for finding an image group similar to the second image group that the one user has newly input from the image group input device from among the image group input by the other user among the previously input first image group. In this case, the output form determination device, for example, determines the output form of the image included in the second image group that the one user has newly input from the image group input device, on the basis of information on an image selected by the other user from among images included in the image group found by the second image group search device.

The output form determination device, for example, determines an image to be extracted from among the image group that the one user has newly input from the image group input device at the same ratio as a ratio between a person image and a non-person image that are included in the image group found by the second image group search device.

The output form determination device, for example, determines an image to be extracted from among the second image group that the one user has newly input from the image group input device at the same ratio as a ratio between a person image and a non-person image that are included in the image group included input by the one user among the previously input image group.

The image processing device may further comprise an image analysis device (image analysis means) for analyzing images included in the second image group that the one user has newly input from the image group input device. In this case, the output form determination device, for example, determines the output form of the images included in the second image group that the one user has newly input from the image group input device on the basis of an analysis score indicating an image analysis result by the image analysis device, and information on the image selected by at least one of the one user or the other user from among the images included in the previously input first image group.

The output form determination device may determine, images to be extracted, images of which the analysis score representing the image analysis result by the image analysis device is equal to or greater than a threshold value among images included in the second image group that the one user has newly input from the image group input device.

The output form determination device may determine an image to be extracted from the second image group that the one user has newly input from the image group input device on the basis of the analysis score representing the image analysis result by the image analysis device, and a similarity score representing a degree of similarity between the image included in the second image group that the one user has newly input from the image group input device and an image selected by the one user among the images included in the previously input first image group.

The image processing device according to the present invention may further include an output form determination algorithm updating device (output form determination algorithm updating means) for updating an algorithm for determining an output form on the basis of the output form determined by the output form determination device.

The output form determination device may determine images to be extracted from among the images included in the second image group that the one user has newly input from the image group input device on the basis of information on images excluded by the one user among the images included in the previously input image group.

According to the present invention, it is possible to determine an output form conforming to the output form of the image selected from among the images included in the previously input first image group, with respect to images included in a newly input second image group.

DESCRIPTION OF THE PREFERRED EMBODIMENTS

First Embodiment

Figure 1:
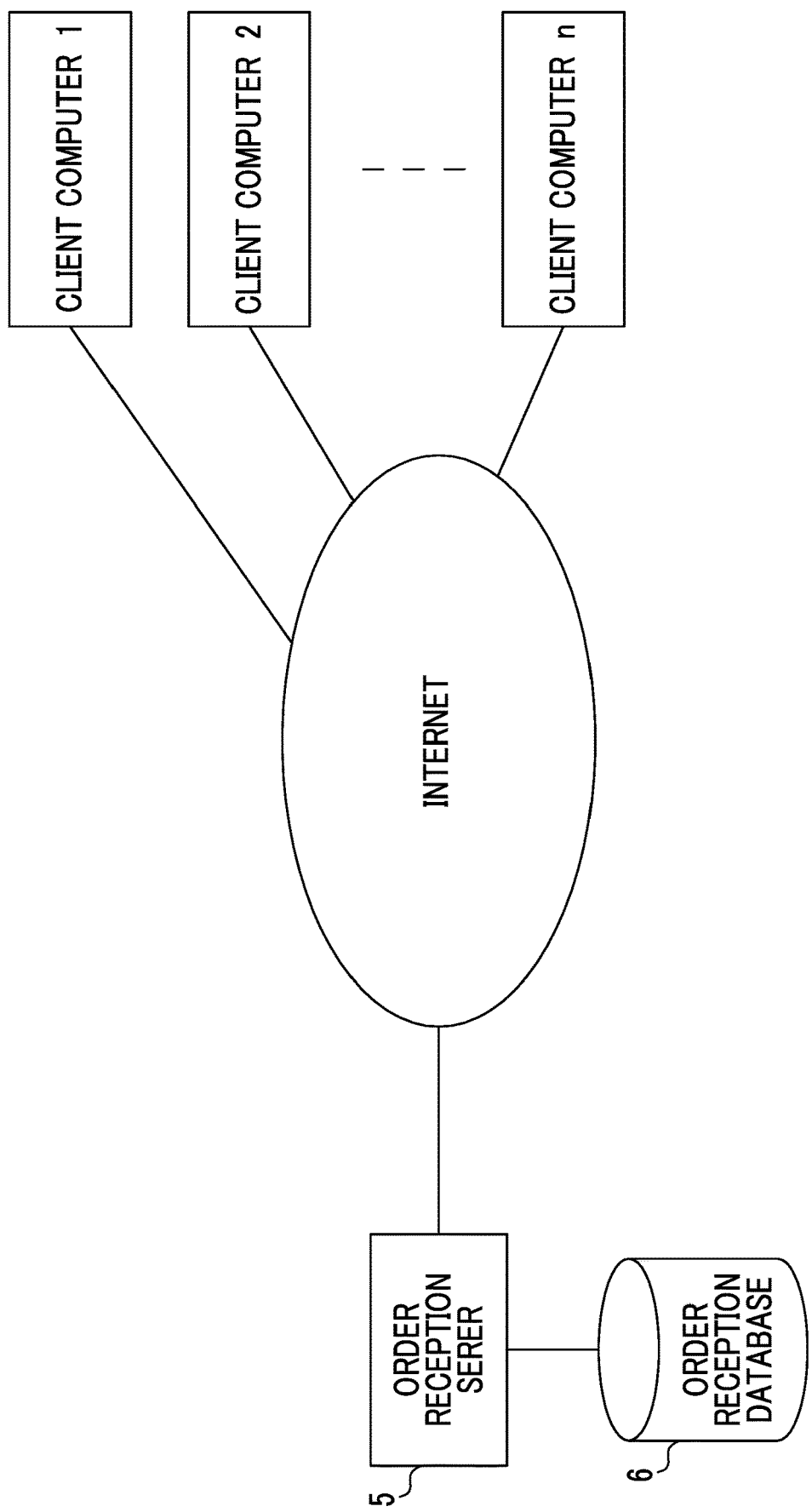
FIG. 1 illustrates an overview of an image processing system.

FIG. 1 illustrates a first embodiment of the present invention, and illustrates an overview of an image processing system.

The image processing system is a system that extracts images from a plurality of images and lays out the extracted images on a page to generate an album.

n (n is a natural number) client computers 1-n and an order reception server 5 are connected to the Internet. An order reception database 6 is connected to the order reception server 5. Each of the client computers 1-*n* and the order reception server 5 can communicate with each other. Each of the client computers 1-*n* and the order reception server 5 constitute an image processing system.

One of the client computers 1-*n* and the order reception server 5 communicate with each other to generate an album.

Figure 2:
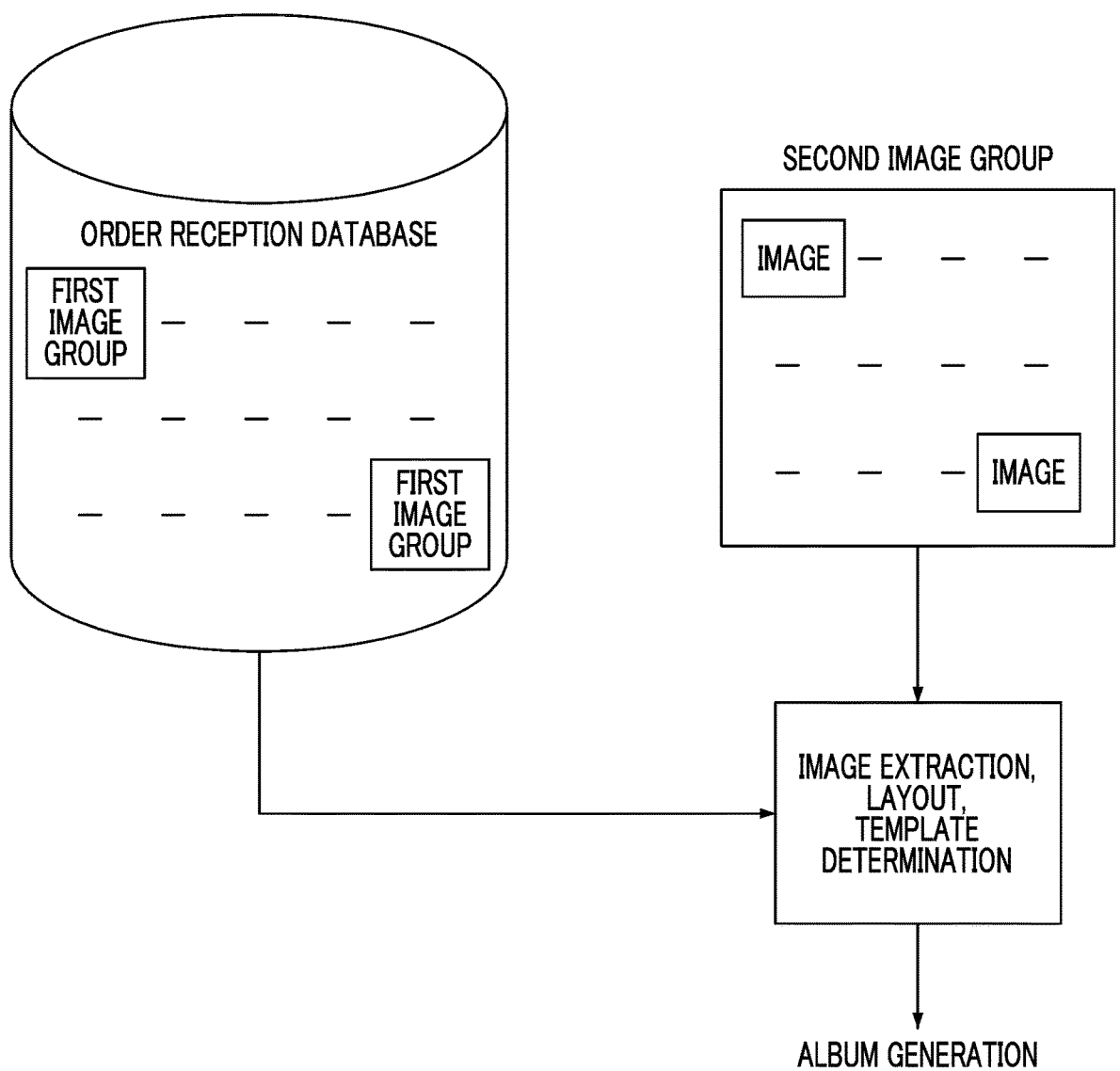
FIG. 2 illustrates an overview of album generation.

FIG. 2 illustrates an overview of album generation according to this embodiment.

Figure 5:
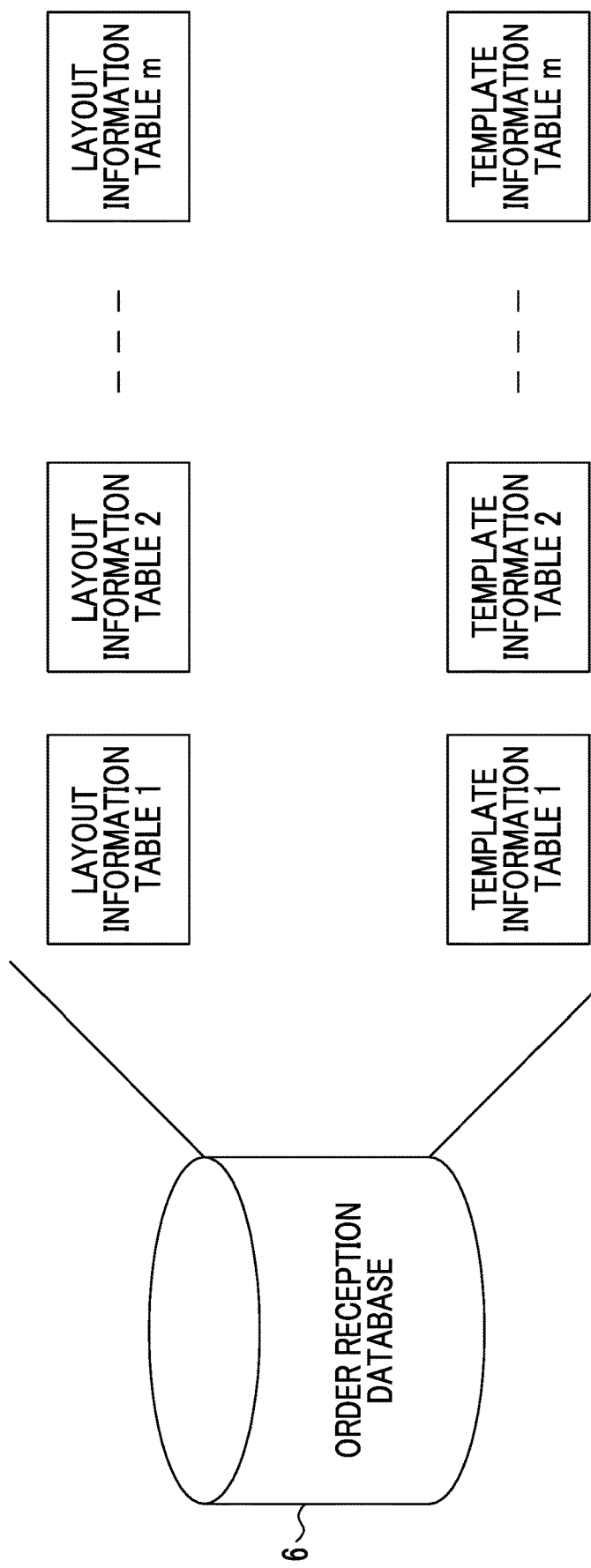
FIG. 5 illustrates content of an order reception database.

In this embodiment, data representing information on a plurality of first image groups is stored in the order reception database 6. The first image group is an image group including a plurality of images that various users have previously used as images for generation of albums, and also includes images that are candidates to be used for the album by the user. The first image group also includes images not used for the album. The first image group is a collection of a plurality of images, and the information on the first image group is information on each of a plurality of images (a layout information table and a template information table as illustrated in FIG. 5).

One user who intends to generate an album newly inputs a second image group including a plurality of images to the order reception server 5. On the basis of, for example, the information on the image extracted as an image to be used for the album in any one of the plurality of first image groups stored in the order reception database 6, extraction of a plurality of images from the second image group and a determination of a layout of the album and a template of the album are performed. Using the extracted images, an album is generated by the determined layout and the determined template. An album similar to the album previously generated on the basis of the first image group is generated from the second image group. A process of generating an album from the second image group will be described in detail below.

Figure 3:
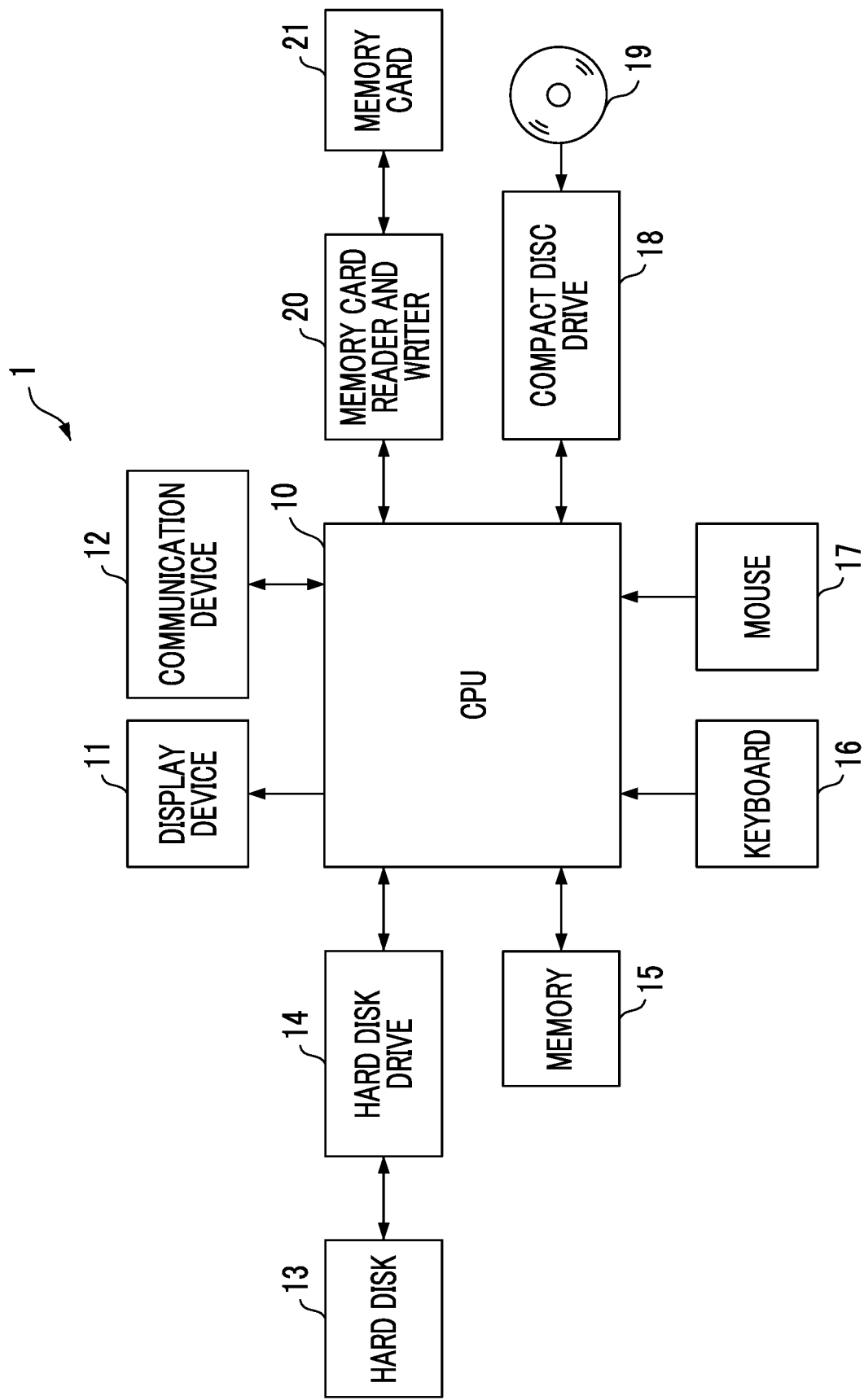
FIG. 3 is a block diagram illustrating an electrical configuration of a client computer.

FIG. 3 is a block diagram illustrating an electrical configuration of a client computer 1. Each of client computers 2-*n* has the same configuration as that of the client computer 1.

AN overall operation of the client computer 1 is controlled by a central processing unit (CPU) 10.

The client computer 1 includes a display device 11 that displays images and other information on a display screen, and a communication device 12 that is connected to the Internet or other networks to communicate with devices other than the client computer 1. Further, the client computer 1 includes a hard disk 13, a hard disk drive 14 that accesses the hard disk 13, a memory 15 that stores data and the like, and a keyboard 16 and a mouse 17 that input commands and the like. Further, the client computer 1 includes a compact disc drive 18 that accesses a compact disc 19, and a memory card reader and writer 20 that writes data to a memory card 21 and reads data recorded on the memory card 21.

An operation program of the client computer 1, which will be described below, is received in the communication device 12 via the Internet. The received operation program is installed in the client computer 1. The operation program may be recorded on a portable recording medium such as the compact disc 19 and read from the portable recording medium, instead of the operation program being received by the client computer 1 via a network such as the Internet and installed in the client computer 1. In this case, the operation program read from the portable recording medium is installed in the client computer 1. It goes without saying that the operation program can be read by a computer (a CPU 10) of the client computer 1.

Figure 4:
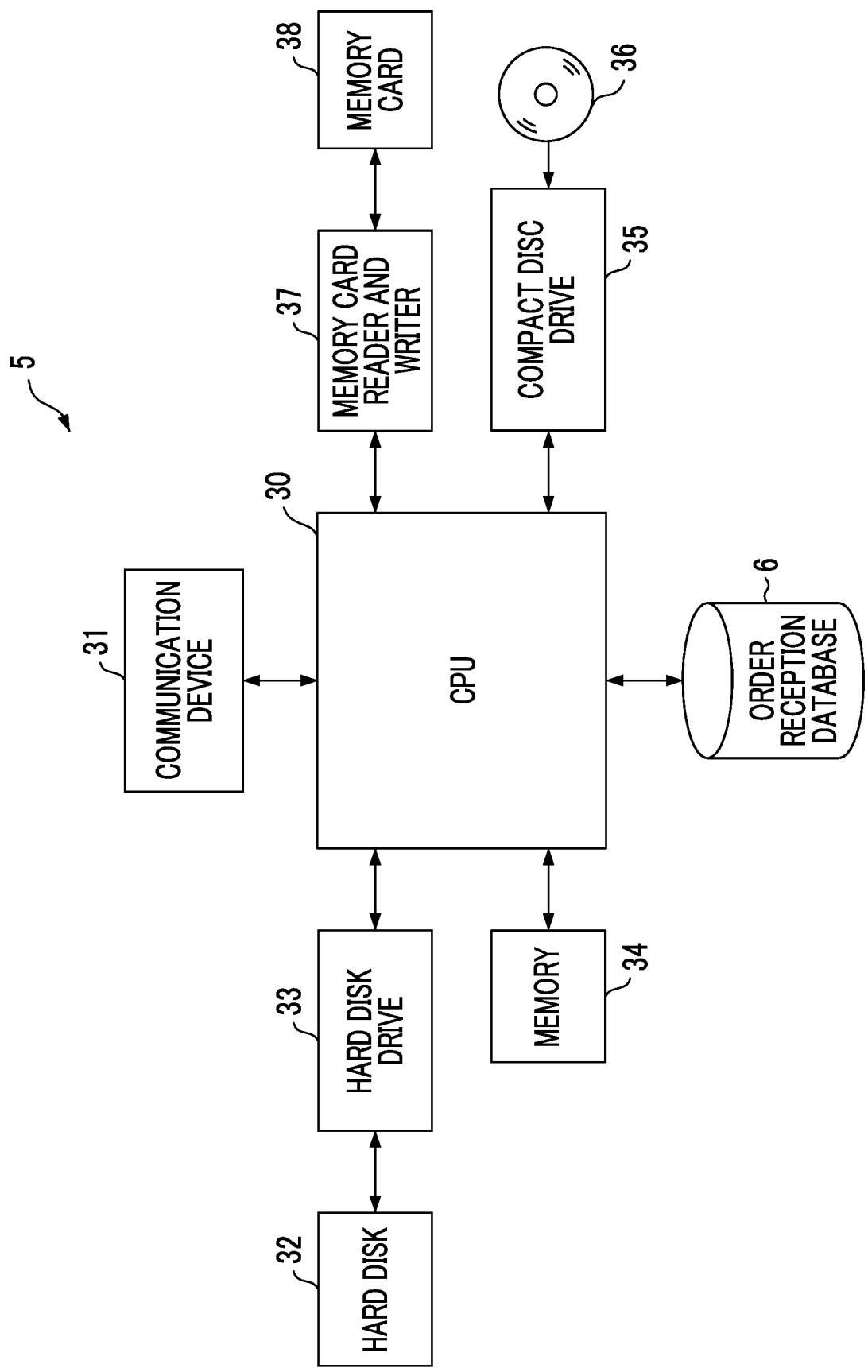
FIG. 4 is a block diagram illustrating an electrical configuration of an order reception server.

FIG. 4 is a block diagram illustrating an electrical configuration of the order reception server 5 to which the order reception database 6 is connected.

An overall operation of the order reception server 5 is controlled by the CPU 30.

The order reception server 5 includes a communication device 31 that is connected to the Internet or other network and communicates with, for example, a device other than the order reception server 5. Further, the order reception server 5 includes a hard disk 32, a hard disk drive 33 that accesses the hard disk 32, and a memory 34 that stores data and the like. Further, the order reception server 5 includes a compact disc drive 35 that accesses a compact disc 36, and a memory card reader and writer 37 that performs writing of data to a memory card 38 and reading of data recorded on the memory card 38.

An operation program of the order reception server 5, which will be described below, is received in the communication device 31 via the Internet. The received operation program is installed in the order reception server 5. The operation program may be received by the order reception server 5 via a network such as the Internet, recorded on a portable recording medium such as the compact disc 36 instead of being installed in the order reception server 5, and read from the portable recording medium. In this case, the operation program read from the portable recording medium is installed in the order reception server 5. It goes without saying that the operation program can be read by a computer (the CPU 30) of the order reception server 5.

FIG. 5 illustrates content stored in the order reception database 6.

m (m is a natural number) layout information tables and m template information tables are stored in the order reception database 6. Layout information for an album generated in the past is stored in the layout information table. Template information used for the album generated in the past is stored in the template information table. A set of one layout information table and one template information table corresponds to the information on one first image group and corresponds to information on one album, as described above.

Table 1 is an example of one of m layout information tables. A user ID is assigned to the layout information table.

TABLE 1

| | | User ID | | | |
|---|---|---|---|---|---|
| Image ID | Feature quantity | Selection | Page | Position | Size |
| 1 | — | Y | 1 | 0, 0 | 60 × 40 |
| 2 | — | N | — | — | — |
| 3 | — | Y | 1 | 100, 100 | 20 × 30 |
| 4 | — | N | — | — | — |
| | | | | | |
| | | | | | |
| | | | | | |
| 100 | — | N | — | — | — |

In the layout information table, feature quantities of a plurality of images are stored corresponding to image IDs. The feature quantity may be resolution of the image, the amount of data, extent of out-of-focus, a type of main subject, a size of a main subject relative to the image, a position of the main subject, tint, and the like. Further, the feature quantity may be generated by combining a plurality of these. Furthermore, the feature quantity may be composed of a plurality of parameters that are output by a learned model previously learned through learning with a teacher or learning without a teacher, which has received an input of an image. Here, a meaning of the feature quantity output from the learned model cannot be interpreted by human, but the feature quantity can be used as a feature quantity of the invention as long as the feature quantity is a numerical value group that is uniquely output in a case where one image has been input. The feature quantity is information necessary for determining whether or not an image is suitable as an image to be used for an album (an image to be extracted from a plurality of images), an arrangement position of the album, or the like. Further, information on selection as to whether a certain user has used or has not used images among a plurality of images for an album, a page of an album of the used images, a position, and a size of the image is also stored in the layout information table. In the selection information, "Y" indicates that an image is used for the album, and "N" indicates that an image is not used for the album. The position is indicated by coordinates in a case where an upper left corner of each page of the album is an origin (0, 0). The size is represented by (horizontal length) mm×(vertical length) mm of an image.

For example, in the case of an image having an image ID1, since the selection information is "Y", the image is selected as an image to be used for the album by each user of the client computer 1-n and extracted by the CPU 10 or the like. Since the page information is "1", the image is used for page 1 of the album. Since the position information is (0, 0), positioning is performed so that an upper left position of the image matches an upper left position of the page. Since the size is 60×40, this shows that the horizontal length is 60 mm and the vertical length is 40 mm. Similarly, in the case of an image having an image ID2, since the selection information is "N", it can be seen that the image is not used for the album.

Table 2 is an example of one of the m template information tables. A user ID is also assigned to the template information table.

TABLE 2

| User ID | |
|---|---|
| Page | Template ID |
| 1 | 3 |
| 2 | 7 |
| 3 | 5 |
| | |
| | |
| | |
| 16 | 20 |

The template information table in Table 2 corresponds to the layout information table in Table 1. A layout information table ID for identifying the layout information table is assigned to each of the layout information tables, and a template information table ID for identifying the template information table is also assigned to each of the template information tables, and the template information table corresponding to the layout information table is managed using the layout information table ID and the template information table ID thereof.

Since the layout information table and the template information table are the information on the album for the first image group, and a plurality of layout information tables and a plurality of template information tables are stored in the order reception database 6, information on the album for a plurality of first image groups is stored in the order reception database 6. Not only the information on the album of the plurality of first image groups, but also the plurality of first image groups themselves (image data itself) may be stored in the order reception database 6, in addition to the information on the album of the plurality of first image groups. In a case where the plurality of first image groups themselves are stored, the feature quantities of the images can be known through analysis. Accordingly, the feature quantities of images may not be stored in the layout information table.

Each time an order of the album is performed as will be described below, the layout information and the template information are transmitted from the client computer, and the layout information and the template information (the information on the album for the first image group) are received in the communication device 31 of the order reception server 5, such that the layout information table and the template information table are generated in the order reception server 5. The generated layout information table and the generated template information table are stored in the order reception database 6 by the order reception server 5.

Figure 6:
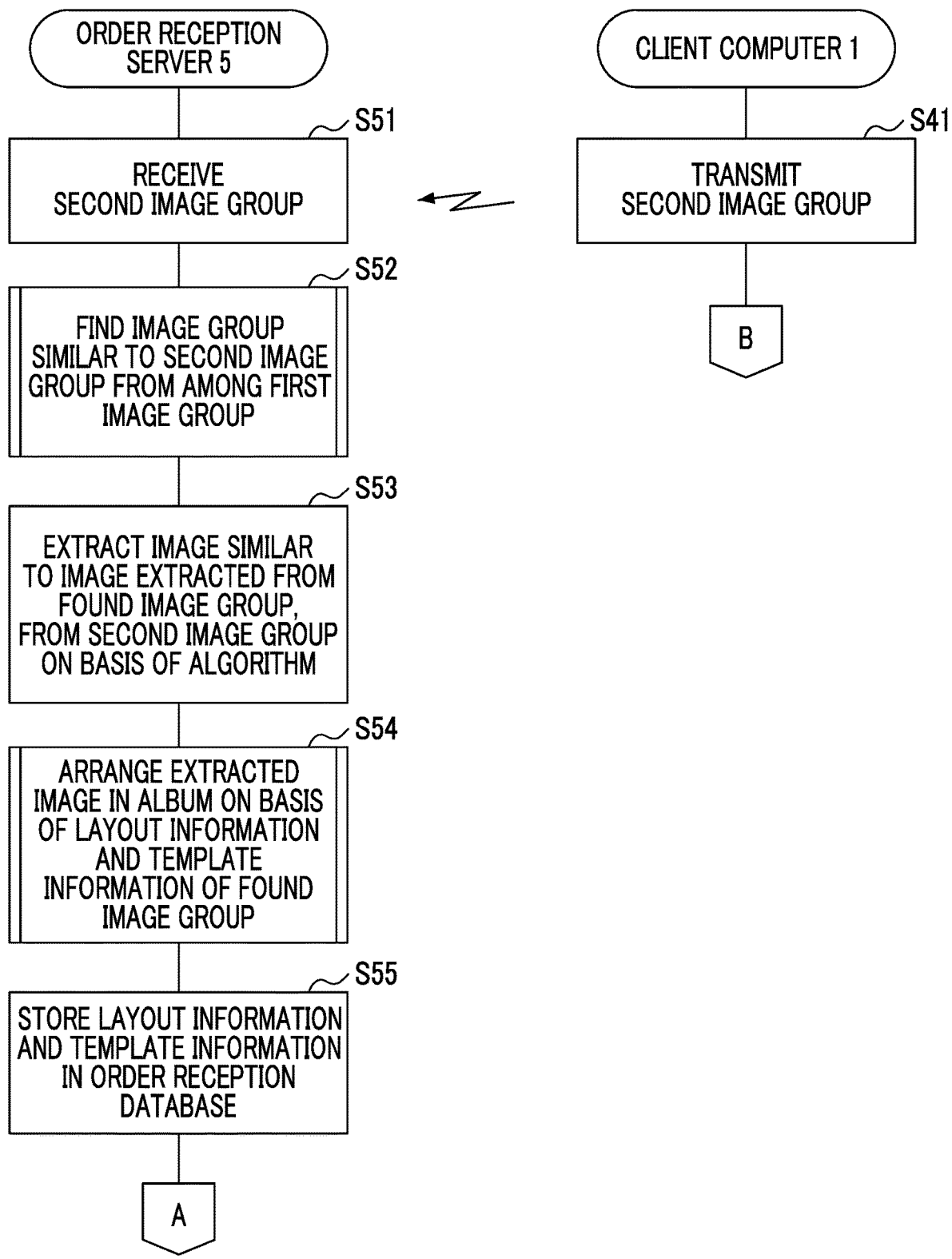
FIG. 6 is a flowchart illustrating a processing procedure of the image processing system.
Figure 7:
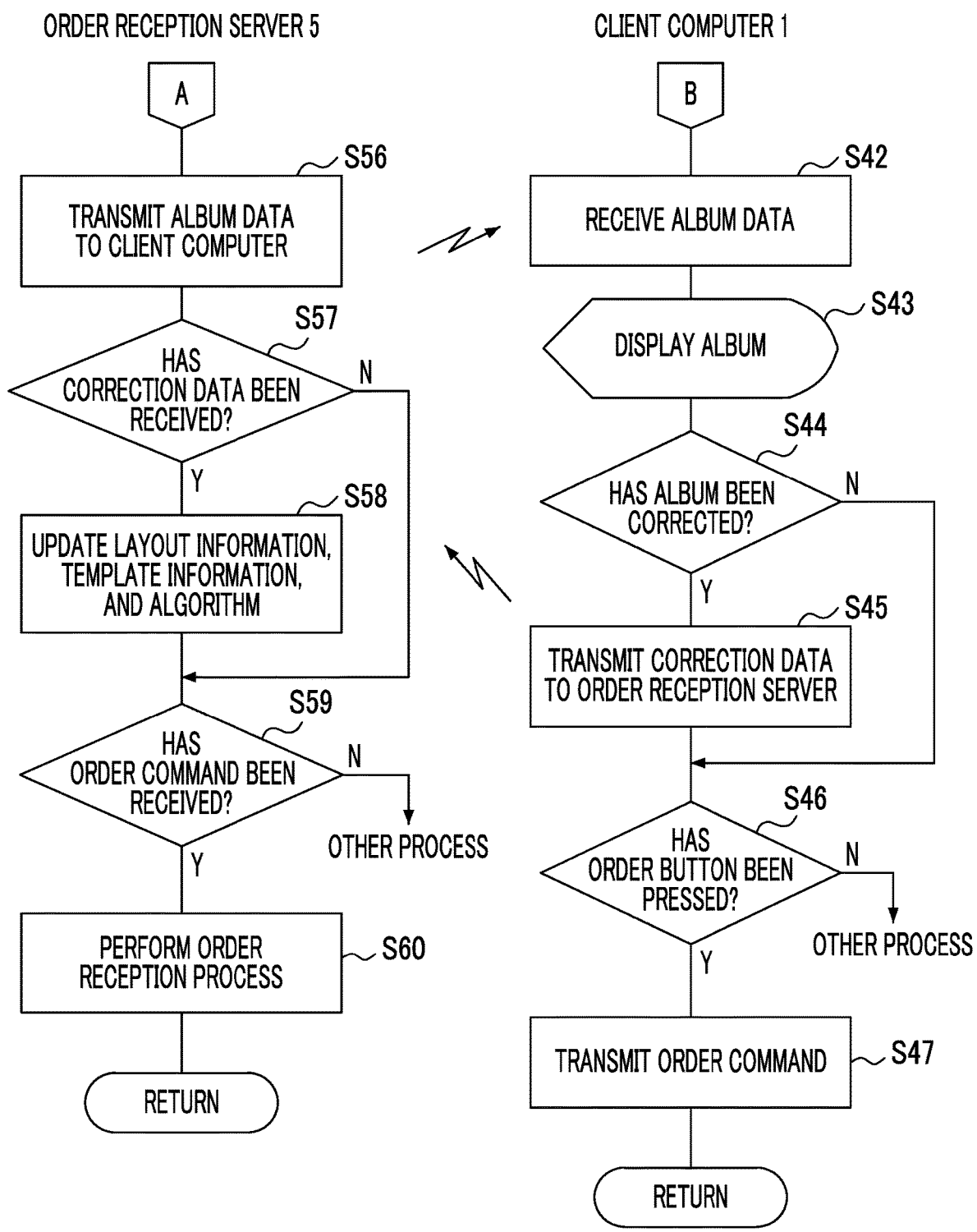
FIG. 7 is a flowchart illustrating a processing procedure of the image processing system.

FIGS. 6 and 7 are flowcharts illustrating processing procedures of the image processing system, and show processing procedures between the order reception server 5 and one of the client computers 1-n. In this embodiment, it is assumed that communication is performed between the client computer 1 and the order reception server 5 (in the first embodiment, the order reception server 5 is an example of an image processing device). Further, a user of the client computer 1 is referred to as one user. It goes without saying that any user of the client computer 2-n other than the client computer 1 may be one user.

As described above, the information (the layout information table and the template information table) for the first image group that is an image group previously input to the order reception server 5 is stored in the order reception database 6.

Image data representing a plurality of images (the second image group) to be used for the album is stored in the memory 15 of the client computer 1. For example, in a case where data representing an image included in the second image group is stored in the memory card 21, the data representing the image included in the second image group is input from the memory card 21 to the client computer 1 by the memory card reader and writer 20. In a case where the client computer 1 is a smart phone, image data representing a plurality of images obtained through accumulation becomes data representing an image included in the second image group each time imaging is performed by a camera of the smartphone.

The image data representing the image included in the second image group is transmitted from the client computer 1 to the order reception server 5 (step S41 in FIG. 6). Data representing the feature quantity of the image included in the second image group rather than the image data itself representing the image included in the second image group may be transmitted from the client computer 1 to the order reception server 5. The data representing the feature quantity may be detected in the client computer 1 or may be detected in another apparatus than the client computer 1.

In a case where the data representing the image included in the second image group transmitted from the client computer 1 (or the data representing the feature quantity of the second image group) is received by the communication device 31 (image group input device) of the order reception server 5 (step S51 in FIG. 6), the CPU 30 of the order reception server 5 searches for information on an album of a first image group similar to the second image group from the information on the album on the plurality of first image groups including the layout information table and the template information table stored in the order reception database 6 (step S52 in FIG. 6).

The information on album of a plurality of first image groups stored in the order reception database 6 may include information on an image group input by one user or may include information on an image group input by another user. In a case where either the information on the image group input by one user or the information on the image group input by another user is included in the order reception database 6, any information that can be found as information on the album on the first image group similar to the second image group may be used. Further, the CPU 30 (first image group search device) may find information on an image group similar to the second image group newly input by one user from the image groups input by the one user among information on a plurality of previously input first image groups or the CPU 30 (second image group search device) may find information on an image group similar to the second image group newly input by one user from the image groups input by another user among information on the plurality of previously input first image groups.

In a case in which the plurality of first image groups themselves are stored in the order reception database 6, the first image group itself may be searched for instead of the information on the first image group. In a case where the first image group itself is searched for, layout information and template information for a plurality of images included in the first image group can also be read.

The similarity of image groups means that the images included in the two image groups are similar to each other. The first image group similar to the second image group means that an image group including a plurality of images similar to the plurality of images included in the second image group is the first image group.

The information on the album for the first image group similar to the second image group is searched for as follows.

Figure 8:
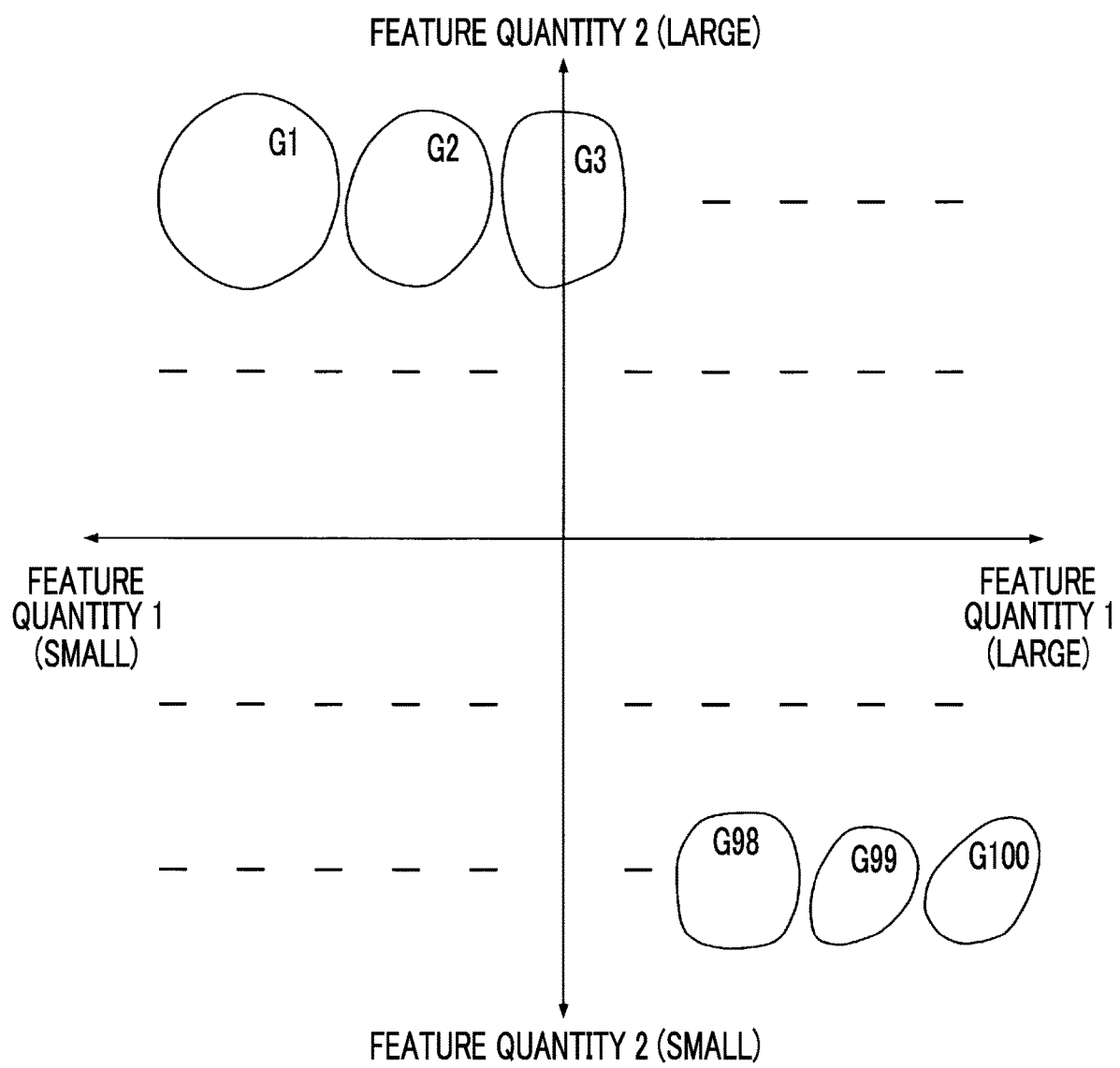
FIG. 8 is an example of an image group classified in a feature quantity space.

FIG. 8 illustrates a state in which the plurality of images included in the second image group are classified into a plurality of groups according to a first stage classification.

In FIG. 8, a horizontal axis indicates a first feature quantity (the feature quantity is one of pieces of information obtained by analyzing the image), and a vertical axis indicates a second feature quantity. FIG. 8 illustrates a state in which a plurality of images are classified into a plurality of groups by the two feature quantities. However, it goes without saying that the number of feature quantities is not two, but three or more feature quantities may be used. In FIG. 8, the CPU 30 divides a plurality of images that are classifying targets into 100 groups from a group G1 to a group G100. This grouping can be realized, for example, by using a k-means method. Images are included in each of the group G1 to the group G100. Of course, even in a case where there is no actual image, a corresponding image (data for identifying an image) may be grouped from a feature quantity of the image.

Figure 9:
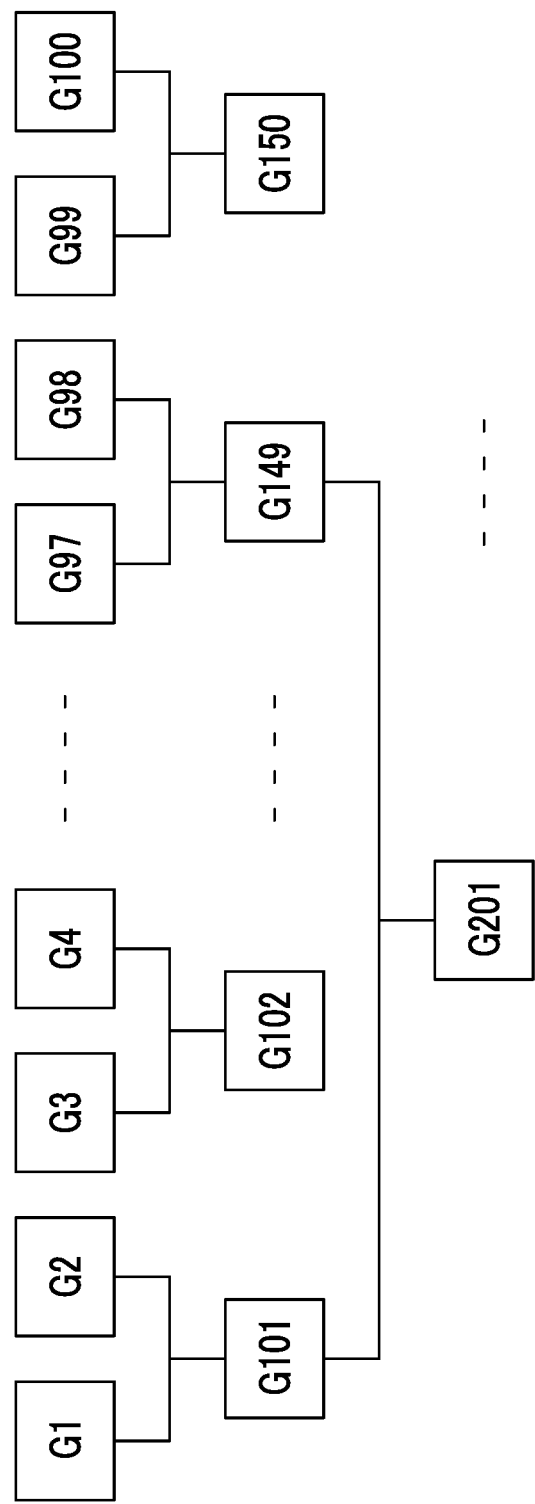
FIG. 9 illustrates a state in which image groups are collected.

FIG. 9 illustrates a state of classifying into a plurality of groups including a group G1 to group G100.

Subsequently, the CPU 30 determines whether or not a degree of similarity between the groups is equal to or smaller than a threshold value, and collects the groups equal to or smaller than the threshold value. For the degree of similarity between the groups, for example, a centroid in a feature quantity space illustrated in FIG. 8 may be obtained for each of the group G1 to group G100 and a degree of similarity between the centroids of the groups may be used.

For example, in a case where a degree of similarity between the group G1 and the group G2 (a degree of similarity between the centroid of the group G1 and the centroid of the group G2) is equal to or smaller than the threshold value, the group G1 and the group G2 are collected and a new group G101 is generated. This collection corresponds to collection of small groups in a case where group G1 and group G2 are regarded as small groups and the degree of similarity between the small groups is equal to or greater than a threshold value (a second threshold value). Similarly, in a case where the degree of similarity between the group G3 and the group G4 is equal to or smaller than the threshold value, the group G3 and the group G4 are collected and a new group G102 is generated. Similarly, the group G97 and the group G98 are collected and a new group G149 is generated, and the group G99 and the group G100 are collected and a new group G150 is generated. Newly generated groups are collected in a case where a degree of similarity between groups is equal to or smaller than the threshold value. For example, the group G101 and the group G149 collected and a new group G201 is generated.

In a case where there is no group of which the degree of similarity is equal to or smaller than the threshold value, images included in the first image group are divided into a collection of small groups (a collection of second small groups) for each similar image, as illustrated in FIG. 9.

Figure 10:
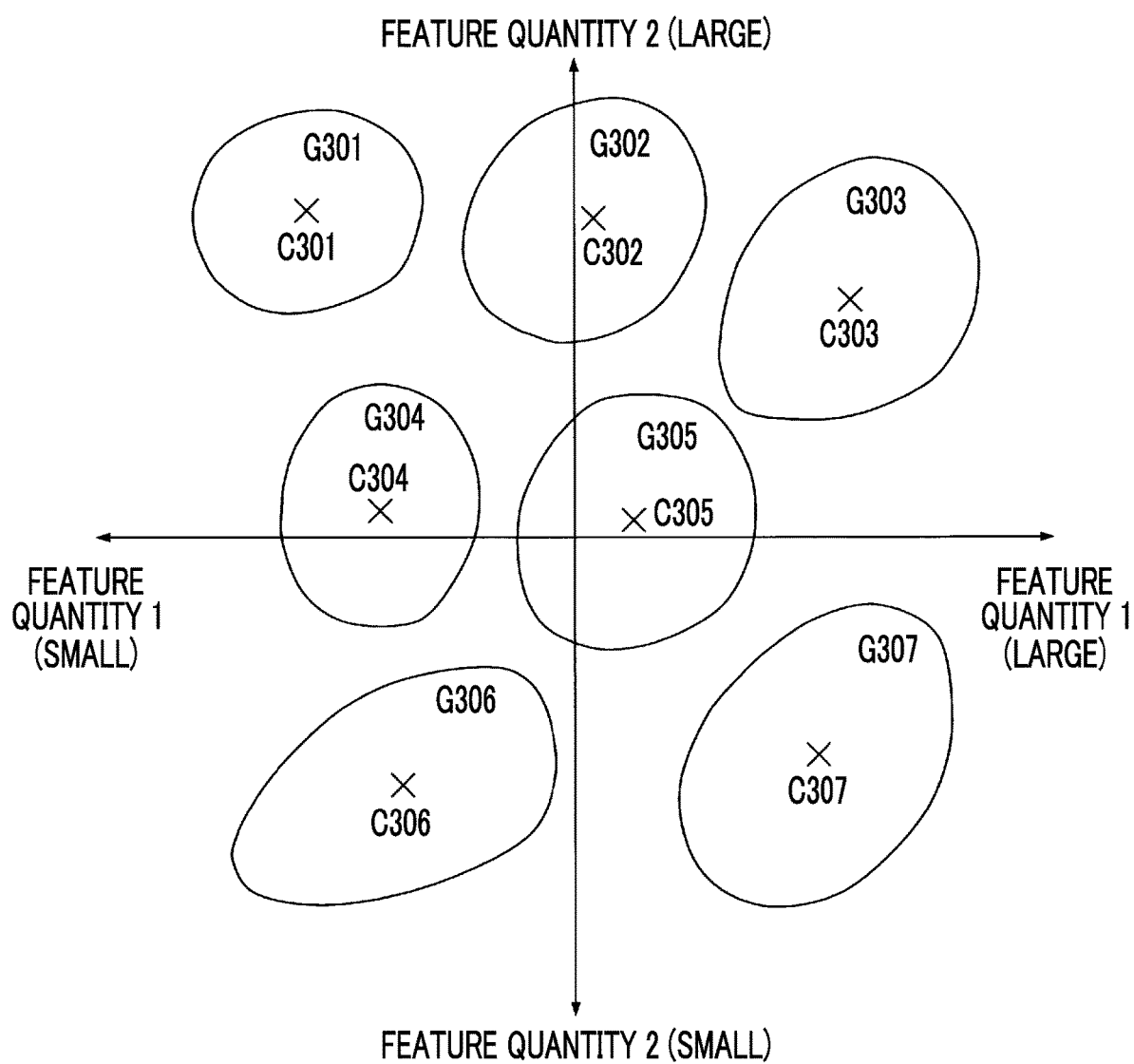
FIG. 10 is an example of an image group classified in a feature quantity space.

FIG. 10 illustrates a feature quantity space defined by a first feature quantity on a horizontal axis, and a second feature quantity on a vertical axis, similar to FIG. 8.

In this feature quantity space, the images included in the second image group are divided into seven small groups including group G301 to group G307. Further, the CPU 30 calculates centroids C301 to C307 in the group G301 to the group G307.

Figure 11:
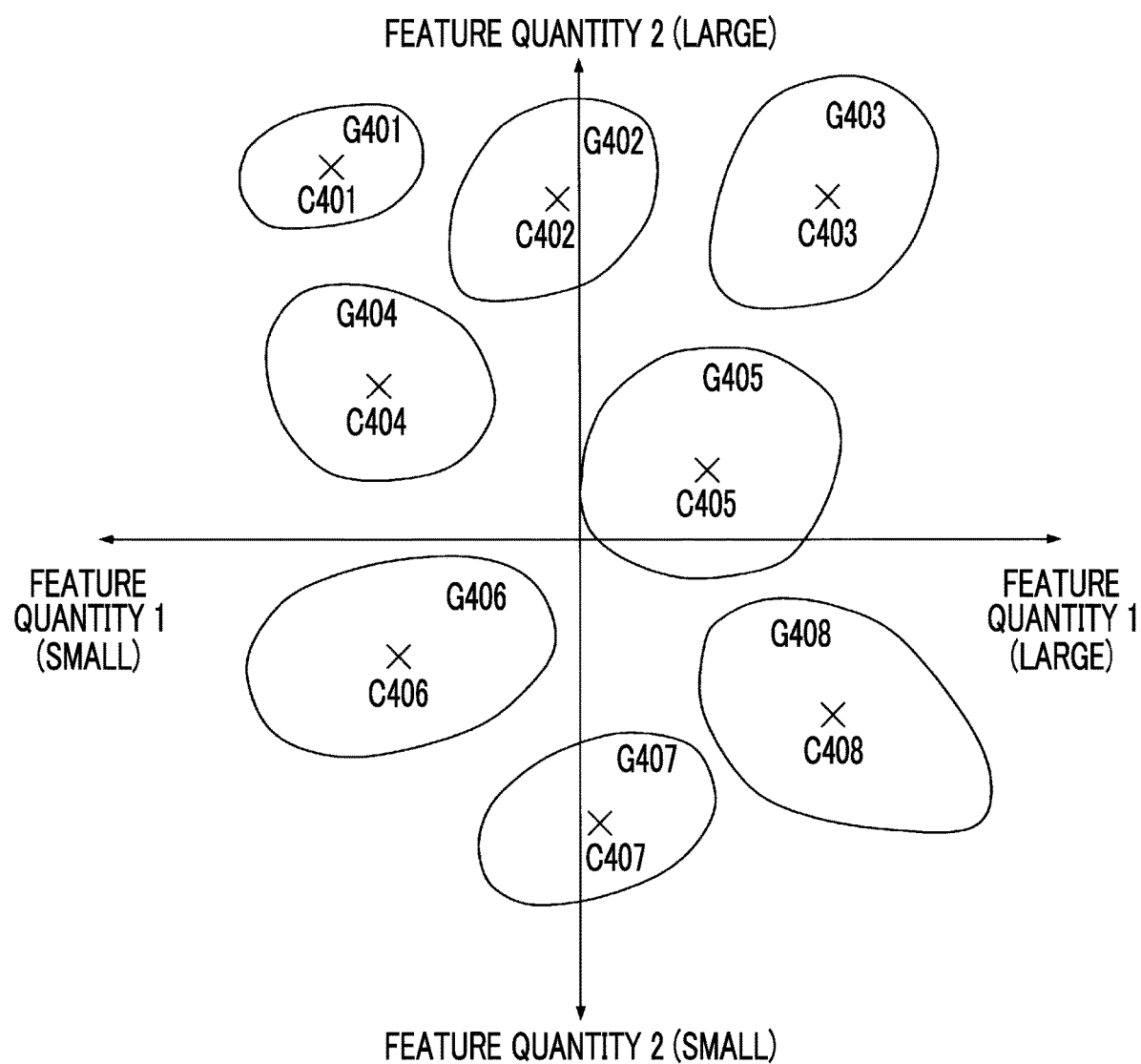
FIG. 11 is an example of an image group classified in a feature quantity space.

Similarly, the process described with reference to FIGS. 8 and 9 is performed on the feature quantities of the plurality of first image groups stored in the order reception database 6, and each of the first image groups is divided into a collection of small groups (a collection of first small groups) of images having a similar feature quantity included in the first image group as illustrated in FIG. 11.

FIG. 11 illustrates a feature quantity space defined by a first feature quantity on a horizontal axis, and a second feature quantity on a vertical axis, similar to FIG. 10.

In this feature quantity space, the feature quantities of the images included in the first image group are divided into eight small groups including group G401 to group G408. Centroids C401 to C408 are calculated in the group G401 to the group G408.

A distribution of feature quantities of the images as illustrated in FIG. 11 is generated for each of the plurality of first image groups stored in the order reception database 6.

A sum of distances in the feature quantity space of the centroid C301 to the centroid C307 of the group G301 to the group G307 generated for the second image group as illustrated in FIG. 10 and the centroid C401 to the centroid C408 of the group G401 to the group G408 generated for the first image group as illustrated in FIG. 11 (a degree of matching between the first small group and the second small group) is calculated for all of the plurality of first image groups. The first image group in which the sum of the distances is equal to or smaller than a threshold value (a degree of matching between the first small group and the second small group is equal to or greater than a threshold value) is searched for by the CPU 30 (image group search device, first image group search device, and second image group search device) as an image group similar to the second image group.

In a case where the image group similar to the second image group is searched for from among the plurality of first image groups, the CPU 30 finds the image extracted from the image group that has been searched for, and extracts an image similar to the extracted image from among the images included in the second image group on the basis of the algorithm (step S53 in FIG. 6). Images in which not only subjects, compositions, and the like are similar but also various feature quantities are similar may be similar images. Thus, the CPU 30 (output state determination device) determines an image to be extracted from among the second image group newly input by one user, on the basis of the information on the image selected by at least one of the one user or the other user from among the previously input first image group (an example of a determination of the output form).

Images extracted from a group of images that have been searched for, as images similar to the second image group, from the plurality of first image groups can be seen by referring to the selection information stored in the layout information table corresponding to the image group that has been searched for in a set of the layout information table and the template information table stored in the order reception database 6. As described above, the image in which the selection information is "Y" is an extracted image.

Figure 12:
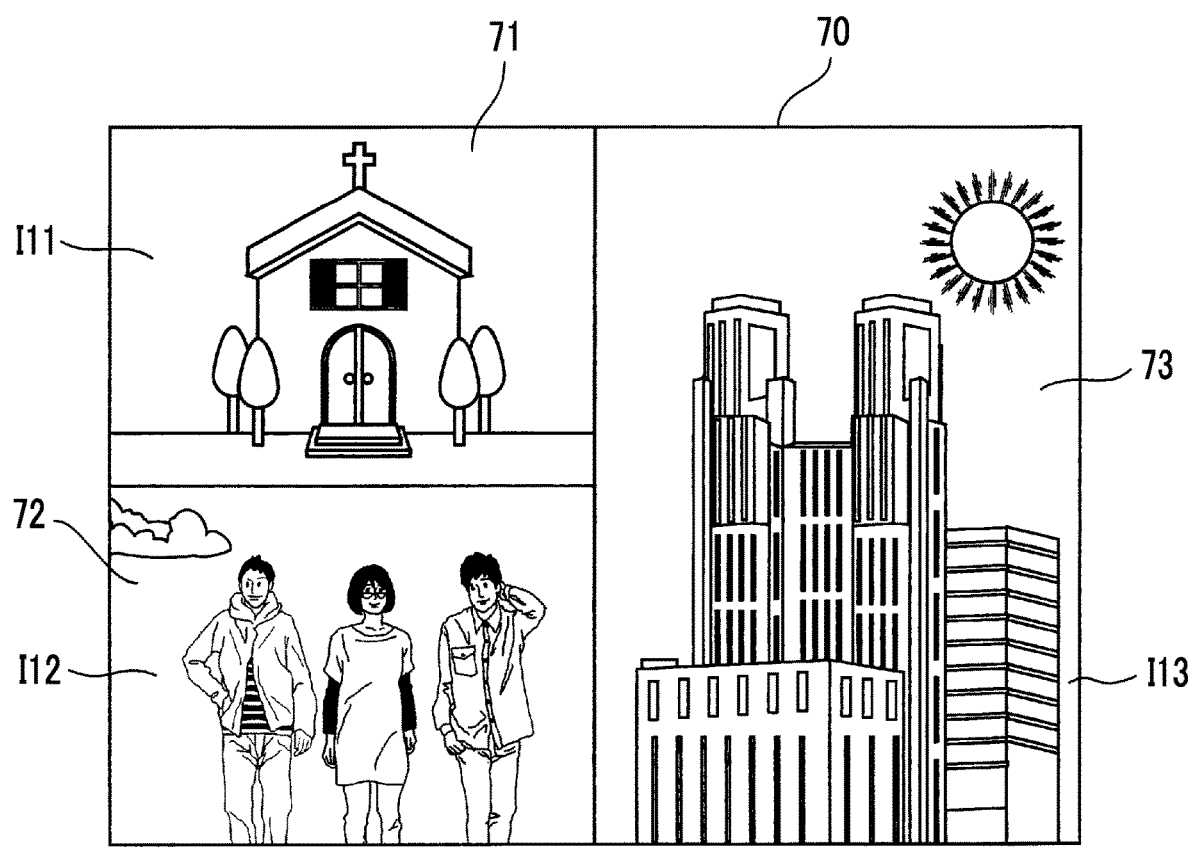
FIG. 12 illustrates a part of an album generated from images included in a second image group.

FIG. 12 illustrates some of pages of an album generated by images extracted from an image group similar to the second image group in the first image group.

A template 70 is used for some of the pages of the album. Areas 71, 72 and 73 to which respective images are affixed on an upper left, a lower left, and a right are defined in this template 70. Images I11, I12, and I13 are affixed to the areas 71, 72 and 73. Information on the template 70 (information indicating which image is affixed to a certain area) is seen from the layout information table and the template information table corresponding to the first image group.

The CPU 30 arranges, in the album, the image extracted from the second image group, which has been newly input by one user (step S54 in FIG. 6). The image is arranged in the album on the basis of the information on the album included in the template information table and the layout information table corresponding to the first image group similar to the second image group.

Figure 13:
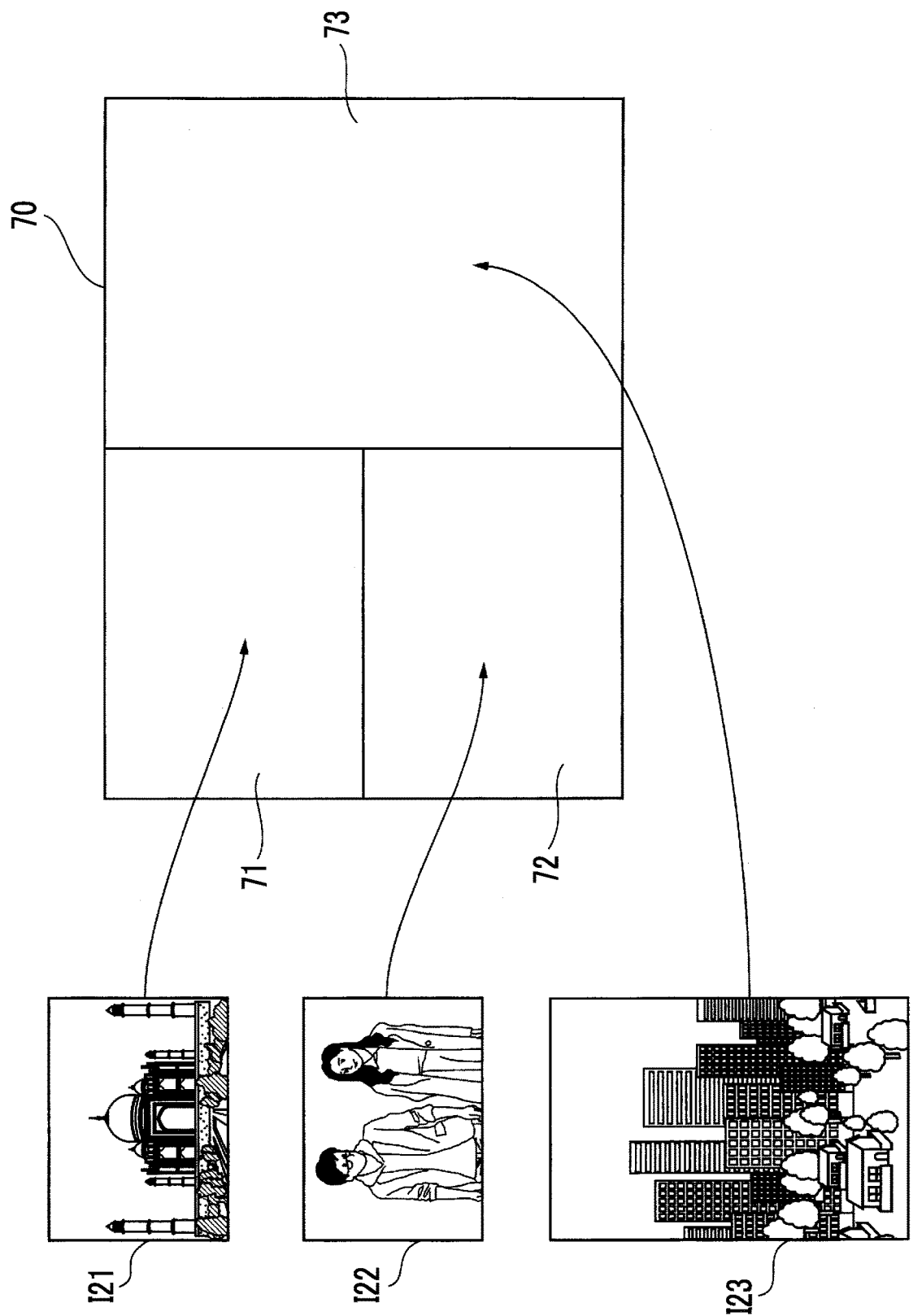
FIG. 13 illustrates a state in which images extracted from a first image group are arranged.

FIG. 13 illustrates a state in which the images extracted from the second image group are arranged in the album.

It is assumed that images I21, I22 and I23 are extracted from the second image group as images similar to the images I11, I12 and I13 extracted from the first image group. Further, the same template as the template 70 to which the images I11, I12 and I13 extracted from the first image group are affixed is found.

The image I21 of the second image group similar to the image I11 of the first image group is arranged in the area 71 in which the image I11 has been arranged. The image I22 of the second image group similar to the image I12 of the first image group is arranged in the area 72 in which the image I12 has been arranged. Similarly, the image I23 of the second image group similar to the image I13 of the first image group is arranged in the area 73 in which the image I13 has been arranged.

Figure 14:
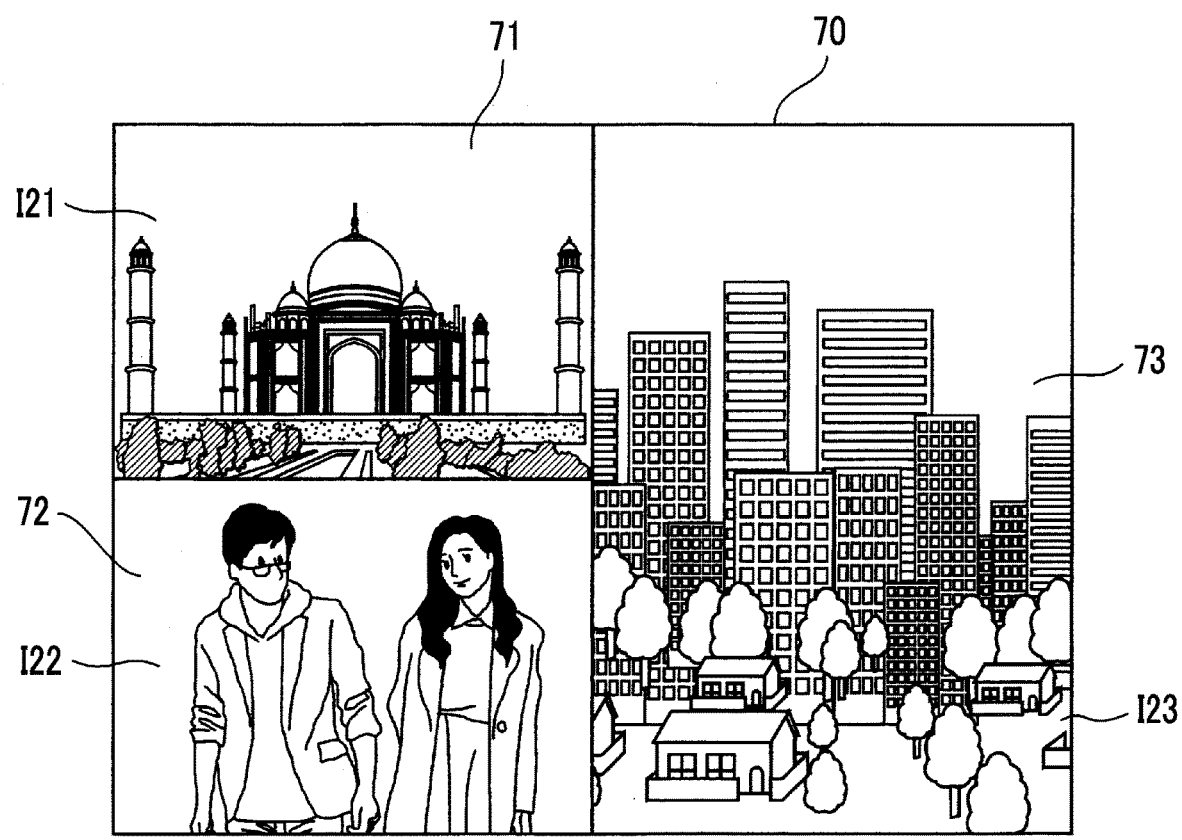
FIG. 14 illustrates a part of an album generated from an image extracted from the first image group.

FIG. 14 illustrates a page of a part of the album generated by the images extracted from the second image group newly input by one user.

The page of the part of the album illustrated in FIG. 14 is generated to be the same album with reference to the page of the part of the album generated by the images extracted from the first image group illustrated in FIG. 12.

As can be seen from comparison of FIG. 12 with FIG. 14, similar images constitute the album with the same layout.

Thus, a template of the album is determined on the basis of a template ID stored in the template information table corresponding to the first image group, and the image extracted from the second image group is arranged in the album according to the page to which images extracted from the first image group are affixed, positions, and sizes. A layout of the second image group newly input by the one user from among the previously input first image group or a template for affixing the image extracted from the second image group is determined by the CPU 30 (the determination of the layout and the determination of the template are an example of determination of the output form). A layout and a template to be determined may not necessarily the same and may be similar.

In a case where an album is generated, processes such as correction of the arrangement positions of the images arranged in the generated album, and change of the images are performed, but the processes will be described in detail below.

In a case where the album is generated from the second image group, the CPU 30 of the order reception server 5 generates a layout information table and a template information table for the second image group, and stores the generated layout information table and the generated template information table in the order reception database 6 (step S55 in FIG. 6).

Subsequently, album data representing the album is transmitted from the order reception server 5 to the client computer 1 (step S56 in FIG. 7).

In a case where the album data is received in the client computer 1 (step S42 in FIG. 7), the album generated by the order reception server 5 is displayed on the display screen of the display device 11 of the client computer 1 (step S43 in FIG. 7).

The user of the client computer 1 confirms the displayed album and corrects the album by himself or herself in a case where the user considers that it is necessary to correct the album. For example, replacement of the images arranged in the album, change of arrangement positions of the images, change of sizes of the images, change of templates, and the like are performed as necessary. In a case where the album has been corrected (YES in step S44 of FIG. 7), correction data indicating corrected content is transmitted from the client computer 1 to the order reception server 5 (step S45 in FIG. 7). The album data after correction may be transmitted to the order reception server 5 instead of the correction data being transmitted.

In a case where the correction data transmitted from the client computer 1 is received by the order reception server 5 (YES in step S57 of FIG. 7), content of the layout information table and the template information table of the first image group is updated on the basis of the received correction data and stored in the order reception database 6 (step S58 in FIG. 7). In addition, in a case where the album is corrected by the user (change of the image affixed to the album, change of the layout, change of the template, or the like), an algorithm for determining an output form to be used in the CPU 30 such as an image extraction algorithm, a layout generation algorithm, and a template selection algorithm is updated by the CPU 30 (output form determination algorithm updating device) on the basis of the correction data.

In a case where the order button is pressed by the user of the client computer 1 (YES in step S46 of FIG. 7), an order command is transmitted from the client computer 1 to the order reception server 5 (step S47 in FIG. 7).

In a case where the order command transmitted from the client computer 1 is received in the order reception server 5 (YES in step S59 of FIG. 7), an order reception process is performed (step S60 in FIG. 7). An album is generated using the layout information table and the template information table corresponding to the second image group newly input by one user among the layout information table and the template information table stored in the order reception database 6. In a case where album data is stored in the order reception server 5, an album may be generated using the album data. An album of which the output form is determined in this way is printed by a printer (an output device) or the like under the control of the CPU 30 (output control device).

According to the first embodiment, a new album can be generated on the basis of layout information and template information that can be obtained according to previous reception of an order of an album.

Second Embodiment

Figure 15:
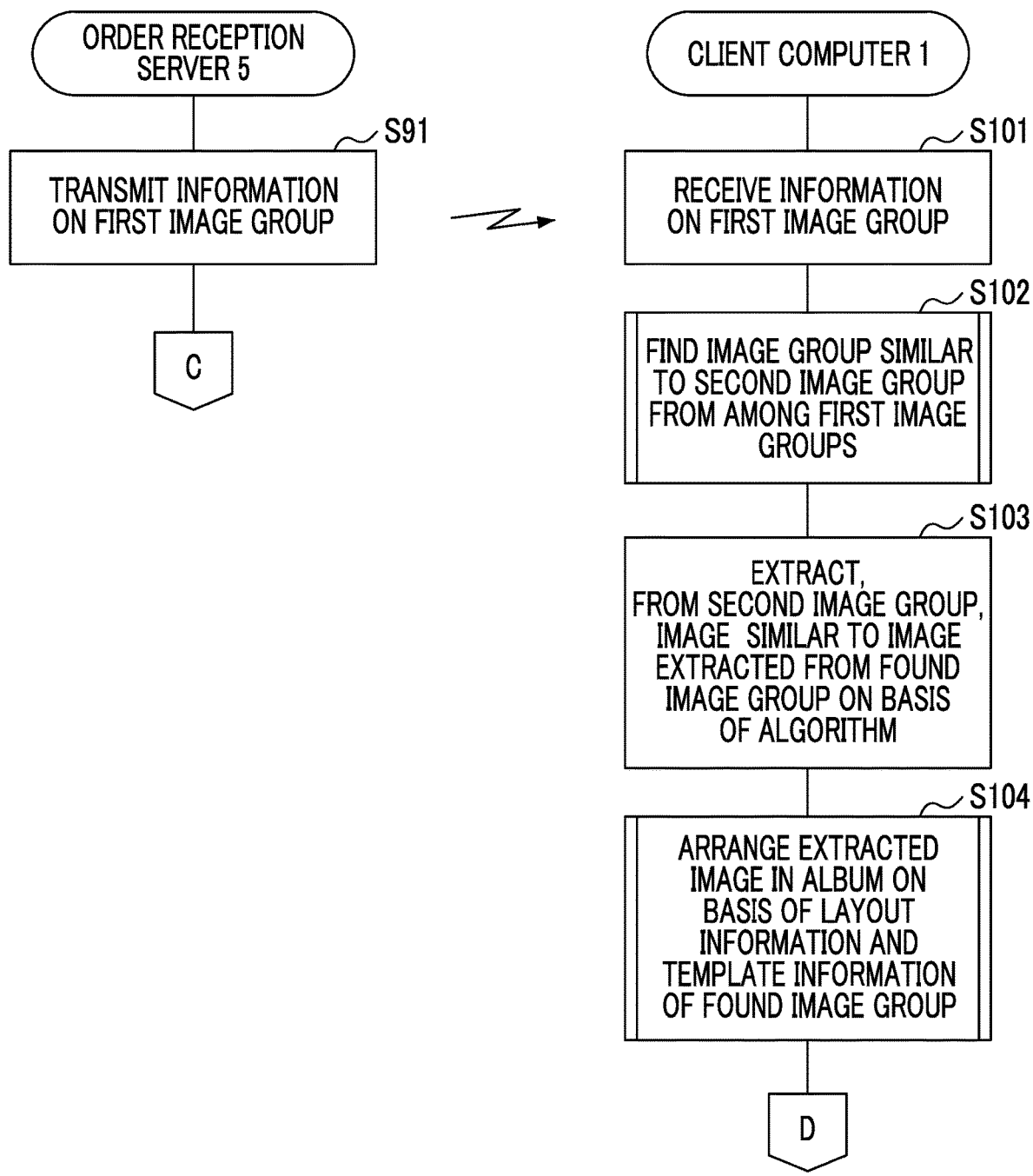
FIG. 15 is a flowchart illustrating a processing procedure of an image editing system.
Figure 16:
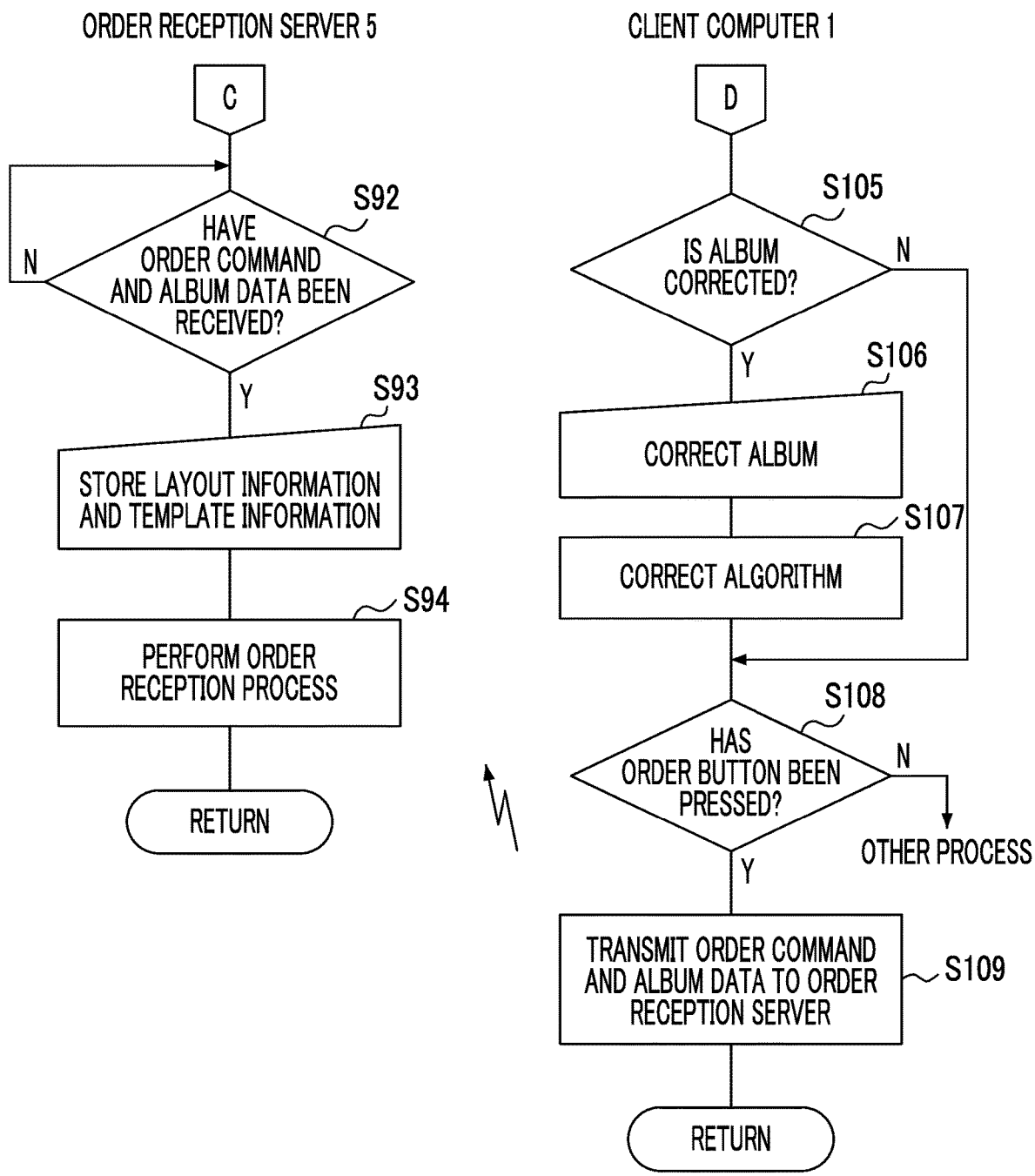
FIG. 16 is a flowchart illustrating a processing procedure of the image editing system.

FIGS. 15 and 16 are flowcharts illustrating a processing procedure of the image processing system, and illustrates a processing procedure between the order reception server 5 and one of the client computers 1-*n*. In a second embodiment, it is assumed that communication is performed between the client computer 1 and the order reception server 5 (in the second embodiment, the client computer 1 is an example of an image processing device).

In the first embodiment, for example, an image extraction process (step S53 in FIG. 6) performed in the order reception server 5 is performed in the client computer 1 in the second embodiment.

m layout information tables and m template information tables representing information on a plurality of first image groups are stored in the order reception database 6 connected to the order reception server 5, as described above, and the information on the plurality of first image groups is transmitted from the order reception server 5 to the client computer 1 (step S91 in FIG. 15).

In a case where the information on the plurality of first image groups transmitted from the order reception server 5 is received in the communication device 12 of the client computer 1 (step S101 in FIG. 15), the received information is temporarily stored in the memory 15.

A second image group including a plurality of images to be used for generation of an album is stored in the memory card 21, and the second image group stored in the memory card 21 is read by the memory card reader and writer 20 (image input device).

The CPU 10 searches for the information on the first image group similar to the read second image group from the information on the plurality of first image groups (image group search device) (step S102 in FIG. 15). In a process of step S102 in FIG. 15, the same process as the process of step S52 in FIG. 6 is performed in the client computer 1. An image group similar to the second image group is substantially searched for from among the plurality of first image groups. Since the layout information table is included in the information on the plurality of first image groups, and the selection information indicating whether or not an image is selected as the image used for the album from the first image group is included in the layout information table, the image group that has been searched for can be said as having the information on the image extracted from the first image group.

Subsequently, the CPU 10 (output form determination device) of the client computer 1 determines and extracts, from the image group that has been searched for, images (for example, the images I21, I22 and I23 in FIG. 13) similar to the images (for example, the images I11, I12 and I13 in FIG. 12) extracted from the first image group (step S103 in FIG. 15). In a process of step S103 in FIG. 15, the same process as the process of step S53 in FIG. 6 is performed in the client computer 1, as described above.

The image extracted from the second image group is arranged in the album as illustrated in FIG. 13 according to the same layout as the layout of the image group searched for from the first image group (step S104 in FIG. 15). In step S104 of FIG. 15, the same process as the process of step S54 of FIG. 6 is performed in the client computer 1 as described above.

Content of the album in which the images extracted from the second image group are arranged is displayed on the display screen of the display device 11 (an output device) of the client computer 1, and the user confirms the content. In a case where it is necessary to correct the content of the album as a result of the confirmation (YES in step S105 of FIG. 16), the CPU 10 (output device control device) performs correction on the basis of an instruction of the user (step S106 in FIG. 16). On the basis of the correction by the user, the image extraction algorithm, the layout determination algorithm, the template determination algorithm, and the like in the CPU 10 are corrected (step S107 in FIG. 16).

In a case where the order button is pressed by the user of the client computer 1 (YES in step S108 of FIG. 16), the order command and the album data are transmitted from the client computer 1 to the order reception server 5 (step S109 in FIG. 16). The album data is data necessary for generating an album as described above. With the album data, an album in which images extracted from the second image group are arranged on respective pages can be generated.

In a case where the order reception server 5 receives the order command and the album data transmitted from the client computer 1 (YES in step S92 of FIG. 16), the CPU 30 of the order reception server 5 analyzes the received album data and obtains the layout information and the template information. A layout information table and a template information table are newly generated from the obtained layout information and the obtained template information and stored in the order reception database 6 (step S93 in FIG. 16). An album is generated from the received album data, and an order reception process is performed (step S94 in FIG. 16).

In the second embodiment, the client computer 1 can generate a new album on the basis of layout information and template information that can be obtained according to previous reception of an order of an album. In the first embodiment, the album data generated in the order reception server 5 is received in the client computer 1 and the album is displayed, whereas in the second embodiment, the album is generated in the client computer 1. A time until the generated album is displayed is shorter than in the first embodiment.

MODIFICATION EXAMPLE

In the above-described embodiment, the image group similar to the second image group newly input by the one user is searched for among the first image group input by one user or the first image group input by another user among the plurality of first image groups stored in the order reception database 6, and the album is generated from the second image group on the basis of the layout information and the template information on the image group searched for. However, in a case in which the first image group input by the one user is stored in the order reception database 6, the first image group input by the other user is not used and an image group similar to the second image group newly input by one user may be searched for from among the first image group input by the one user. In a case where the first image group input by the one user is not stored in the order reception database 6, an image group similar to the second image group is searched for from among the first image group input by the other user.

Further, in the above-described embodiment, the image group similar to the second image group newly input by one user is found from the previously input first image group, and the determination of an image to be extracted from among the images included in the second image group, the determination of the layout, the determination of the template, and the like are performed on the basis of the layout information and the template information of the found image group, but it is not always necessary to find the similar image group. Extraction of images from the newly input second image group, a determination of a layout, a determination of a template, and the like may be performed on the basis of the images extracted from any one first image group input by the one user or the other user, the determined layout, the determined template, and the like. Preferably, the extraction of images from the second image group newly input from one user, the determination of the layout, the determination of the template, and the like are performed on the basis of the image extracted from the first image group previously input by one user, the determined layout, the determined template, and the like. An album according to the preference of one user who has generated the album in the past is generated. In this case, images to be extracted from the newly input second image group may be determined to have the same ratio as a ratio between a person image included in the image group that has been searched for (the person image refers to an image in which a main subject is determined to be a person, such as a proportion of the person in the entire image is equal to or greater than a threshold value or an image in which a person is arranged with a size equal to or greater than a threshold value in a central portion of the image) and a non-person image (a non-person image refers to an image other than a person image), and an album may be generated. An album can be generated from the second image group at a ratio corresponding to the preference of the ratio between the person images and the non-person images extracted from the previously input first image group.

Furthermore, in a case where an image group similar to the second image group newly input by the one user is searched for from among the first image group previously input by one user, the image to be extracted from the newly input second image group may be determined at the same ratio as a ratio between a person image and a non-person image included in the image group that has been searched for, and an album may be generated. An album can be generated from the second image group at a ratio corresponding to the preference of the ratio between the person image and the non-person image by the one user.

In addition, even in a case where an image group similar to the second image group newly input by the one user is searched for from among the first image group previously input by the other user, the image to be extracted from the newly input second image group may be determined at the same ratio as a ratio between a person image and a non-person image included in the image group that has been searched for, and an album may be generated. This is because, in a case where images are extracted from a similar image group, the preference of the ratio between the person image and the non-person image can be considered to be similar even in a case where the user is different between the one user and the another user, and an album can be generated from the second image group at a ratio corresponding to the ratio between the person image and the non-person image extracted by the other user.

Further, images included in the second image group newly input by one user may be analyzed by the CPU 10 or 30 (image analysis device). The output form of the image included in the second image group can be determined on the basis of an analysis score indicating image analysis results and the information on the image selected by at least one of one user or another user. For example, the image included in the second image group is analyzed, and an analysis score indicating evaluation of an image is calculated. For example, the analysis score becomes high in a case where a degree of sharpness of the image is high, the main subject is close to a center, and the evaluation of the image such as a direction of a face is considered to be higher. An image of which the analysis score calculated in this way is equal to or greater than a threshold value is extracted from the second image group, and a layout, a template, and the like are determined.

Further, a similarity score representing a degree of similarity between the image included in the second image group newly input by one user and the image included in the first image group previously input by the one user may be calculated by the CPU 10 of the client computer 1 or the CPU 30 of the order reception server 5, and an image of which a total score that is a sum of the calculated similarity score and the analysis score obtained from the image analysis result, such as the similarity score and the analysis score, is equal to or greater than a threshold value may be determined and extracted from the second image group. An image similar to a previously selected image, which is an image having a high evaluation as an image, is extracted from the image included in the second image group.

Furthermore, although the image group similar to the second image group is searched for from among the first image group and an image similar to the image extracted by the user in the image group that has been searched for is extracted from among the second image group in the above-described embodiment, an image similar to an image which has not been extracted by the user in the image group that has been searched for may not be extracted from the second image group, and an image to be extracted from the second image group may be determined. The image not extracted by the user can be seen from the fact that "N" is assigned as the selection information of the layout information table.

The client computer 1 and the like can be configured not only by a personal computer but also by using a tablet terminal or a smartphone.

Further, in the above-described embodiment, the album is generated using the images extracted from the first image group, but the present invention is not limited to a case where the album is generated, and the present invention can also be used for the case of shuffle print in which a plurality of images are affixed to an image merchandise material such as one sheet of paper, and a case in which images are extracted from a plurality of images and the extracted images are printed one by one.

A dedicated electric circuit that is a processor having a dedicated circuit configuration designed to execute a specific process, such as a programmable logic device of which a circuit configuration can be changed after manufacturing such as a field-programmable gate array (FPGA), an application specific integrated circuit (ASIC), or the like, in addition to the CPU 10 of the client computer 1 and the CPU 30 of the order reception server 5 that execute software to function as various processing units, are included in the processing unit that executes the above-described process.

One processing unit may be configured with one of the various processors or with a combination of the same or different types of two or more processors (for example, a plurality of FPGAs, a combination of a CPU and an FPGA). As an example in which a plurality of processing units are configured with one processor, first, there is an aspect in which one processor is configured with a combination of one or more CPUs and software, and this processor functions as a plurality of processing units, as represented by a computer such as a client computer or a server. Second, there is an aspect in which a processor that realizes a function of the entire system including a plurality of processing units using one integrated circuit (IC) chip is used, as represented by a system-on-chip or the like. Thus, the various processing units are configured with one or more processors as a hardware structure.

Further, the hardware structure of the various processors is more specifically an electric circuit obtained by combining circuit elements such as semiconductor elements. Explanation of References.

What is claimed is:

1. An image processing device comprising:
   an image group input circuit for inputting an image group;
   a processor for generating a first output form including a first image group, wherein a second output form is generated based on the first output form, the second output form including an image included in a second image group that is an image group that one user has newly input from the image group input circuit on the basis of information on images selected by at least one of the one user or another user among images included in the first image group inputted before the second image group and is different from the second image group; and
   a first image group search circuit for finding an image group of images similar to all of the images of the second image group,
   wherein the processor determines a template for pasting the second image included in the second image group to be the same layout as a template on which the first image included in the first image group was pasted to an image pasting area, and pastes the second image similar to the first image to a corresponding image pasting area, and
   the processor determines the output form of the image included in the second image group that the one user has newly input from the image group input circuit, on the basis of information on an image selected by the one user from among images included in the image group found by the first image group search circuit.

2. The image processing device according to claim 1, further comprising:
   an output device control circuit for controlling an output device so that output is performed according to the output form determined by the processor.

3. The image processing device according to claim 1, wherein the previously input first image group is an image group input by the one user.

4. The image processing device according to claim 1, wherein the previously input first image group is an image group input by the other user.

5. The image processing device according to claim 1, wherein the processor determines an image to be extracted from among the second image group that the one user has newly input from the image group input circuit, a layout of the image included in the second image group that the one user has newly input from the image group input circuit, or a template for affixing the image included in the second image group that the one user has newly input from the image group input circuit, on the basis of information on the image selected by the one user among the previously input first image group.

6. The image processing device according to claim 1, wherein the processor determines the output form of the image included in the image group that the one user has newly input from the image group input circuit, on the basis of information on an image selected by the one user from among image group input by the one user among the previously input first image group.

7. The image processing device according to claim 1, wherein the processor determines the output form of the image included in the second image group that the one user has newly input from the image group input circuit, on the basis of information on an image selected by the other user from among image groups input by the other user among the previously input first image group.

8. The image processing device according to claim 1, wherein the processor determines an image to be extracted from among the second image group that the one user has newly input from the image group input circuit at the same ratio as a ratio between a person image and a non-person image that are included in the image group found by the first image group search circuit.

9. The image processing device according to claim 1, further comprising:
   a second image group search circuit for finding an image group similar to the second image group that the one user has newly input from the image group input circuit from among the image group input by the other user among the previously input first image group,
   wherein the processor determines the output form of the image included in the second image group that the one user has newly input from the image group input circuit, on the basis of information on an image selected by the other user from among images included in the image group found by the second image group search circuit.

10. The image processing device according to claim 9, wherein the processor determines an image to be extracted from among the image group that the one user has newly input from the image group input circuit at the same ratio as a ratio between a person image and a non-person image that are included in the image group found by the second image group search circuit.

11. The image processing device according to claim 1, wherein the processor determines an image to be extracted from among the second image group that the one user has newly input from the image group input circuit at the same ratio as a ratio between a person image and a non-person image that are included in the image group input by the one user among the previously input image group.

12. The image processing device according to claim 1, further comprising:
an image analysis circuit for analyzing images included in the second image group that the one user has newly input from the image group input circuit,
wherein the processor determines the output form of the images included in the second image group that the one user has newly input from the image group input circuit on the basis of an analysis score indicating an image analysis result by the image analysis circuit, and information on the image selected by at least one of the one user or the other user from among the images included in the previously input first image group.

13. The image processing device according to claim 12, wherein the processor determines, images to be extracted, images of which the analysis score representing the image analysis result by the image analysis circuit is equal to or greater than a threshold value among images included in the second image group that the one user has newly input from the image group input circuit.

14. The image processing device according to claim 12, wherein the processor determines an image to be extracted from the second image group that the one user has newly input from the image group input circuit on the basis of the analysis score representing the image analysis result by the image analysis circuit, and a similarity score representing a degree of similarity between the image included in the second image group that the one user has newly input from the image group input circuit and an image selected by the one user among the images included in the previously input first image group.

15. The image processing device according to claim 1, further comprising:
an output form determination algorithm updating device for updating an algorithm for determining an output form on the basis of the output form determined by the processor.

16. The image processing device according to claim 1, wherein the processor determines images to be extracted from among the images included in the second image group that the one user has newly input from the image group input circuit on the basis of information on images excluded by the one user among the images included in the previously input image group.

17. The image processing device according to claim 1, wherein the first output form and the second output form are the same.

18. An image processing method comprising:
inputting, by image group input circuit, an image group;
generating, by a processor, a first output form including a first image group, wherein a second output form is generated based on the first output form, the second output form including an image included in a second image group that is an image group that one user has newly input from the image group input circuit on the basis of information on images selected by at least one of the one user or another user among images included in the first image group inputted before the second image group and is different from the second image group; and
finding, by a first image group search circuit, an image group of images similar to all of the images of the second image group,
wherein the processor determines a template for pasting the second image included in the second image group to be the same layout as a template on which the first image included in the first image group was pasted to an image pasting area, and pastes the second image similar to the first image to a corresponding image pasting area, and
the processor determines the output form of the image included in the second image group that the one user has newly input from the image group input circuit, on the basis of information on an image selected by the one user from among images included in the image group found by the first image group search circuit.

19. Non-transitory recording medium storing a computer-readable program for controlling a computer of an image processing circuit to
input an image group;
generate, by a processor, a first output form including a first image group, wherein a second output form is generated based on the first output form, the second output form including an image included in a second image group that is an image group that one user has newly input, on the basis of information on images selected by at least one of the one user or another user among images included in the first image group inputted before the second image group and is different from the second image group; and
find, by a first image group search circuit, an image group of images similar to all of the images of the second image group,
wherein the processor determines a template for pasting the second image included in the second image group to be the same layout as a template on which the first image included in the first image group was pasted to an image pasting area, and pastes the second image similar to the first image to a corresponding image pasting area, and
the processor determines the output form of the image included in the second image group that the one user has newly input from the image group input circuit, on the basis of information on an image selected by the one user from among images included in the image group found by the first image group search circuit.

* * * * *